Patented Nov. 27, 1945

2,390,024

UNITED STATES PATENT OFFICE 2,390,024

CARBOXY-SUBSTITUTED PIMELIC ACIDS

Herman A. Bruson, Philadelphia, Pa., assignor to The Resinous Products & Chemical Company, Philadelphia, Pa., a corporation of Delaware No Drawing. Application September 22, 1942, Serial No. 459,301

6 Claims. (Cl. 260—537)

This invention relates to new polycarboxylic acids having the formula

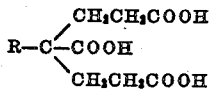

wherein R is a hydrocarbon or substituted hydrocarbon group.

These acids possess useful properties in the form of their esters or amides for the preparation of plastics, plasticizers, and resinous compositions.

Although γ-carboxy-pimelic acid,

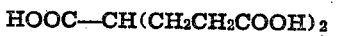

has been prepared, it is obtainable only with great difficulty and at a high cost by decarboxylating pentane-α,γ,γ,ε-tetracarboxylic acid or pentane-α,α,γ,γ,ε,ε-hexacarboxylic acid. These methods are not practical for the preparation of γ-hydrocarbon substituted - γ - carboxy - pimelic acids, which have properties quite removed from those of the acids having a hydrogen atom in the gamma position.

An object of this invention is to provide γ-carboxy-pimelic acids carrying a hydrocarbon or substituted hydrocarbon group on the γ-carbon atom, by a simple method adapted for commercial manufacture.

I have found that polycarboxylic acids having the formula

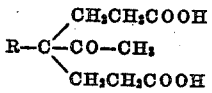

wherein R is a hydrocarbon or substituted hydrocarbon group, are readily converted by means of alkaline hypohalite solution to the above desired γ-carboxy-carboxylic acids according to the reaction:

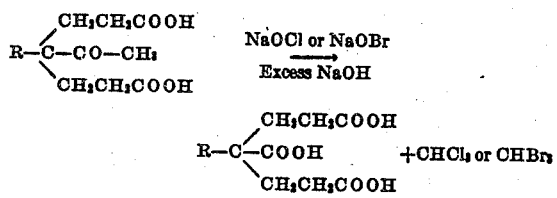

The γ-acetyl-γ-substituted pimelic acids, or a salt thereof, used as the starting materials are readily obtained by alkaline hydrolysis of the polycyanoethylation products derived by reacting acrylonitrile in the presence of alkali upon ketones having formulas such as

R—CH₂—CO—CH₃ or

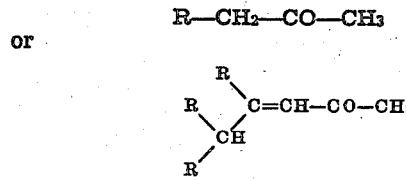

wherein R is hydrogen or a hydrocarbon group, as described in copending applications Serial No. 389,332, filed April 19, 1941, Serial No. 414,593, filed October 11, 1941, and Serial No. 421,314, filed December 2, 1941.

In general, the reaction between the γ-acetyl-γ-substituted pimelic acid or a salt thereof and alkaline hypohalite solution is performed by mixing the two reactants between 0° C. and about 100° C., whereby chloroform is produced. The chloroform is readily removed or separated and the salt of the desired acid is formed, which, upon acidification with a strong acid, such as sulfuric, hydrochloric, etc., is converted to the desired γ-carboxy-γ-substituted pimelic acid.

Because of the usually high solubility of these acids, it is desirable to extract them to purify them. Some of the acids having long-chained substituents, however, may be precipitated or separated directly.

In this manner, there may be obtained, by choice of suitable ketones, acids of the formula

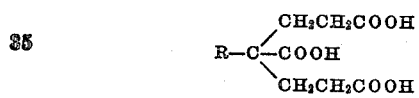

wherein R is aliphatic (saturated or unsaturated, straight or branched chained), aryl, aralkyl, cycloalkyl, or other hydrocarbon radical, or a substituted hydrocarbon group, such as methyl, ethyl, propyl, isopropyl, butyl, isobutyl, sec.-butyl, hexyl, octyl, dodecyl, hexadecyl, octadecyl, octadecenyl, allyl, methallyl, cinnamyl, benzyl, tert.-butylbenzyl, phenylethyl, chlorophenyl, cyclohexyl, methylcyclohexyl, bornyl, naphthyl, bromoethyl, carboxyethyl, etc.

The following examples illustrate this invention:

*Example 1*

γ-*Carboxy-γ-methyl-pimelic acid.*—A solution of alkaline potassium hypochlorite was prepared by stirring at 50° C. a solution of 660 grams of water and 165 grams of calcium hypochlorite (70% available chlorine) with a solution of 115 grams of anhydrous potassium carbonate, 33 grams of potassium hydroxide and 330 grams of water for about ten minutes and filtering off the precipitate of calcium carbonate.

The clear filtrate was stirred, and to it was added dropwise a solution of 71 grams of γ-acetyl-γ-methyl-pimelic acid in 200 grams of 20% sodium hydroxide solution while the reaction mixture was maintained at 60°-70° C. by external cooling. Chloroform was evolved. After all of this solution had been added to the hypochlorite solution, the resulting mixture was stirred for one hour longer at 60°-70° C., and any excess hypochlorite was destroyed by adding a solution of sodium bisulfite. The solution was then acidified with hydrochloric acid and the clear solution evaporated to dryness in vacuum. The solid residue, upon extraction with acetone and evaporation of the extract, deposited 65 grams of crude γ-carboxy-γ-methyl-pimelic acid. The pure compound forms colorless crystals melting at 111° C. It is readily soluble in water and is conveniently crystallized from nitromethane.

The γ-acetyl-γ-methyl-pimelic acid used as starting material is a crystalline solid, melting point 125° C., obtainable by alkaline hydrolysis of the dicyanoethylation product of methyl ethyl ketone.

*Example 2*

γ-Carboxy-γ-ethyl-pimelic acid.—To a stirred filtered solution of potassium hypochlorite prepared as in Example 1 from 250 grams of calcium hypochlorite in 1,000 grams of water and a solution of 175 grams of $K_2CO_3$, 50 grams of KOH and 500 grams of water, there was gradually added a solution of 115 grams of γ-acetyl-γ-ethyl-pimelic acid in 300 grams of 20% sodium hydroxide at 60°-70° C. Chloroform was evolved. The mixture was stirred for eight hours longer at room temperature and was then treated with sufficient sodium bisulfite to destroy any excess of hypochlorite. The solution was acidified with 250 grams of concentrated hydrochloric acid and evaporated to dryness in vacuum. The solid residue, upon extraction with acetone, yielded 105 grams of crystalline product upon evaporation of the acetone extract. The pure γ-carboxy-γ-ethyl-pimelic acid forms colorless crystals melting at 172° C. after recrystallization from water or nitromethane.

The γ-acetyl-γ-ethyl-pimelic acid used is a crystalline solid, melting point 112°-113° C., obtainable by alkaline hydrolysis of the dicyanoethylation product of methyl propyl ketone.

*Example 3*

γ-Carboxy-γ-phenyl-pimelic acid.—To a stirred filtered solution of potassium hypochlorite, prepared by treating 50 grams of calcium hypochlorite in 200 cc. of water with a solution of 35 grams of $K_2CO_3$, 10 grams of KOH and 100 cc. of water, there was gradually added at 60°-70° C. a solution of 27.8 grams of γ-acetyl-γ-phenyl-pimelic acid in 60 grams of aqueous 20% sodium hydroxide. Chloroform was evolved. The mixture was stirred for one hour longer after reaction had ceased. It was then acidified with concentrated hydrochloric acid and the clear solution evaporated to dryness in vacuum. Upon extraction of the residue with acetone and evaporation of the filtered extract, crude γ-carboxy-γ-phenyl-pimelic acid was obtained as a resinous mass which, upon recrystallization from nitromethane, formed colorless crystals melting at 154° C.

The γ-acetyl-γ-phenyl-pimelic acid used as starting material is a crystalline solid, melting point 171°-172° C., obtainable by alkaline hydrolysis of the dicyanoethylation product of phenylacetone.

*Example 4*

γ-Carboxy-γ-(carboxy-ethyl)-pimelic acid.—To a stirred suspension of 340 grams of water and 85 grams of calcium hypochlorite there was added at 50° C. a solution of 60 grams of $K_2CO_3$, 17 grams of KOH, and 170 grams of water. The calcium carbonate was filtered off. To the stirred filtrate, at 60°-70° C., there was added dropwise a solution of 136 grams of 20% sodium hydroxide and 46.5 grams of 1,1,1-tri-(β-carboxy-ethyl)-acetone. Chloroform was evolved. The mixture was stirred for two hours after reaction had ceased. Excess of hypochlorite was destroyed with sodium bisulfite solution, and the mixture was acidified with concentrated hydrochloric acid. The clear solution obtained was evaporated to dryness in vacuum on a steam bath. The dry residue was extracted with hot acetone and the acetone extract evaporated to dryness. The γ-carboxy-γ-(carboxy-ethyl)-pimelic acid was obtained as a colorless crystalline solid melting at 192° C. after softening at 182° C.

The 1,1,1-tri-(β-carboxy-ethyl)-acetone used as starting material is a crystalline solid, melting point 149°-150° C., obtainable by alkaline hydrolysis of the tricyanoethylation product of acetone.

*Example 5*

γ-Carboxy-γ-isopropenyl-pimelic acid.—To a stirred filtered solution of potassium hypochlorite, prepared by treating a suspension of 250 grams of calcium hypochlorite in 1,000 cc. of water at 50° C. with a solution of 175 grams of $K_2CO_3$, 50 grams of KOH and 500 cc. of water, there was added gradually at 60°-70° C. a solution of 121 grams of γ-acetyl-γ-isopropenyl-pimelic acid in 300 grams of aqueous 20% sodium hydroxide. Chloroform was evolved. The mixture was stirred for three hours after reaction had apparently ceased. Excess of hypochlorite was then destroyed by adding sodium bisulfite solution. The resulting solution was acidified with concentrated hydrochloric acid and evaporated to dryness in vacuum. The dry residue was extracted with acetone. Upon evaporation of the filtered acetone extract, 115 grams of crystalline product was obtained. After recrystallization from water, the γ-carboxy-γ-isopropenyl-pimelic acid formed colorless crystals melting at 160° C.

The γ-acetyl-γ-isopropenyl-pimelic acid used as starting material is a crystalline solid, melting point 136°-137° C., obtainable by alkaline hydrolysis of the dicyanoethylation product of mesityl oxide.

*Example 6*

γ-Carboxy-γ-isopropyl-pimelic acid.—A solution of 13 grams of $K_2CO_3$, 3.7 grams of KOH and 37 cc. of water was added to a stirred suspension of 18.5 grams of calcium hypochlorite in 75 cc. of water at 50° C. The precipitated $CaCO_3$ was filtered off and washed with 50 cc. of water, the washings being combined with the filtrate. To this clear solution, a solution of 9 grams of γ-acetyl-γ-isopropyl-pimelic acid was added dropwise at 55°-65° C. Chloroform was evolved. The mixture was stirred for one hour at 65° C. after the reaction had apparently ceased, and any excess hypochlorite was destroyed by adding sodium bisulfite solution. The resulting solution was acidified with concentrated hydrochloric acid and cooled to 0° C. The crystalline product which separated melted at 160°–161° C. after recrystallization from water or nitro-methane and was identified as γ-carboxy-γ-isopropyl-pimelic acid.

The γ-acetyl-γ-isopropyl-pimelic acid used as starting material is a crystalline solid, melting point 148° C., obtainable by alkaline hydrolysis of the dicyanoethylation product of methyl-isobutyl-ketone.

*Example 7*

γ-*Carboxy-γ-butyl-pimelic acid.*—To a stirred, filtered solution of potassium hypochlorite prepared by treating a suspension of 125 grams of calcium hypochlorite in 500 cc. of water at 50° C. with a solution of 88 grams of K₂CO₃, 25 grams of KOH, and 250 cc. of water, there was added gradually at 60°–70° C. a solution of 64.5 grams of γ-acetal-γ-butyl-pimelic acid in 150 grams of aqueous 20% sodium hydroxide. Chloroform was evolved. Stirring was continued one hour after reaction had apparently ceased, and any excess hypochlorite was destroyed by adding sodium bisulfite solution. Upon acidifying the solution with concentrated hydrochloric acid and cooling to 5° C., a white crystalline product separated, from which, by recrystallization from water, pure γ-carboxy-γ-butyl-pimelic acid was obtained in colorless crystals melting at 125° C.

The γ-acetal-γ-butyl-pimelic acid used as starting material is a crystalline solid, melting point 60°–61° C., obtainable by alkaline hydrolysis of the dicyanoethylation product of methyl-n-amyl ketone.

*Example 8*

γ-*Carboxy-γ-amyl-pimelic acid.*—The method given in Example 7 is carried out, using 68 grams of γ-acetyl-γ-amyl-pimelic acid in place of the γ-acetyl-γ-butyl-pimelic acid.

The γ-carboxy-γ-amyl-pimelic acid is obtained as a colorless crystalline solid which can be recrystallized from water and melts at 114°–115° C.

The γ-acetyl-γ-amyl-pimelic acid used as starting material is a crystalline solid, melting point 73°–74° C., obtainable by alkaline hydrolysis of the dicyanoethylation product of methyl-n-hexyl ketone.

By reaction of a hypohalite, such as sodium hypobromite or hypochlorite, in alkaline solution with a compound of the formula

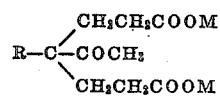

wherein R is a hydrocarbon group or substituted hydrocarbon group and M is hydrogen or a metal cation, there are formed the salts of the formula

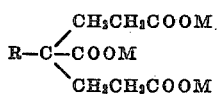

which are readily converted to the corresponding acid with a strong inorganic acid or an acid forming insoluble salts when M is a metal ion. The compounds in which R is an aliphatic hydrocarbon group are of particular importance and interest.

I claim:

1. As a new compound, a γ-carboxy-pimelic acid having the formula

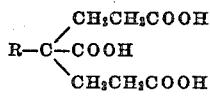

wherein R is an aliphatic hydrocarbon group.

2. As a new compound, a γ-carboxy-γ-lower alkyl-pimelic acid.

3. As a new compound, γ-carboxy-γ-methyl-pimelic acid.

4. As a new compound, γ-carboxy-γ-ethyl-pimelic acid.

5. As a new compound, γ-carboxy-γ-amyl-pimelic acid.

6. The method of preparing γ-carboxy-γ-aliphatic hydrocarbon substituted pimelic acid which comprises reacting with an alkaline hypohalite solution a compound of the formula

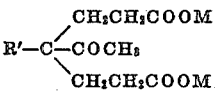

wherein R' is an aliphatic hydrocarbon group and M is a member of the class consisting of hydrogen and soluble salt-forming cations, and acidifying the resultant product.

HERMAN A. BRUSON.